(12) United States Patent
Zhou et al.

(10) Patent No.: US 11,544,260 B2
(45) Date of Patent: Jan. 3, 2023

(54) TRANSACTION PROCESSING METHOD AND SYSTEM, AND SERVER

(71) Applicant: CHINA UNIONPAY CO., LTD., Shanghai (CN)

(72) Inventors: Jiajing Zhou, Shanghai (CN); Hao Miao, Shanghai (CN); Jien Zhou, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 17/041,030

(22) PCT Filed: Jan. 25, 2019

(86) PCT No.: PCT/CN2019/073233
§ 371 (c)(1),
(2) Date: Sep. 24, 2020

(87) PCT Pub. No.: WO2019/184577
PCT Pub. Date: Oct. 3, 2019

(65) Prior Publication Data
US 2021/0026854 A1    Jan. 28, 2021

(30) Foreign Application Priority Data
Mar. 29, 2018  (CN) .......................... 201810273942.5

(51) Int. Cl.
*G06F 16/2453* (2019.01)
*G06F 16/2455* (2019.01)
(Continued)

(52) U.S. Cl.
CPC .... *G06F 16/24542* (2019.01); *G06F 16/2455* (2019.01); *G06F 16/258* (2019.01); *G06F 16/283* (2019.01)

(58) Field of Classification Search
CPC ........... G06F 16/24542; G06F 16/2455; G06F 16/258; G06F 16/283; G06F 16/1794;
(Continued)

(56) References Cited

U.S. PATENT DOCUMENTS 5,873,075 A  *  2/1999  Cochrane ............ G06F 16/2365
6,480,842 B1 * 11/2002  Agassi ................ G06F 16/2428
(Continued)

FOREIGN PATENT DOCUMENTS

CA        2167793 A1     7/1996
CA        2401348 A1     9/2001
(Continued)

OTHER PUBLICATIONS

Pavlo et al., On Predictive Modeling for Optimizing Transaction Execution in Parallel OLTP Systems, The 38th International Conference on Very Large Data Bases,Aug. 27-31, 2012, Istanbul, Turkey.Proceedings of the VLDB Endowment, vol. 5, No. 2, pp. 85-96. (Year: 2012).*

(Continued)

*Primary Examiner* — Cheyne D Ly
(74) *Attorney, Agent, or Firm* — Renner, Otto, Boisselle & Sklar, LLP

(57) ABSTRACT

A transaction processing method and system, and a server. The method includes: after a first node obtains at least one statement corresponding to a first transaction, the first node may classify each statement, and send the at least one statement to at least one second node according to the type of each statement, respectively, so that the at least one second node generates an execution plan corresponding to the received statement according to the statement; then the first node may process the first transaction according to the received execution plan which corresponds to the at least one statement of the first transaction and is sent by the at (Continued)

least one second node. In this way, embodiments can process statements of multiple types at the same time, thereby effectively improving the processing efficiency of the system, reducing the operating burden of the system, and ensuring the transactionality of the system.

12 Claims, 8 Drawing Sheets

(51) Int. Cl.
  *G06F 16/25* (2019.01)
  *G06F 16/28* (2019.01)
(58) Field of Classification Search
  CPC .......... G06F 16/22; G06F 16/24; G06F 16/26; H04L 67/1097; H04L 67/10; H04L 67/327; H04L 67/63
  See application file for complete search history.

(56) References Cited

U.S. PATENT DOCUMENTS

| | | |
|---|---|---|
| 6,990,503 B1* | 1/2006 | Luo .................... G06F 16/2343 |
| 7,689,582 B2 | 3/2010 | Behnen et al. |
| 7,984,043 B1 | 7/2011 | Waas |
| 2007/0214171 A1 | 9/2007 | Behnen et al. |
| 2007/0276833 A1* | 11/2007 | Sen .................... G06F 16/27 |
| 2012/0130942 A1* | 5/2012 | Dipper ............... G06F 16/254 |
| | | 707/602 |
| 2013/0282650 A1* | 10/2013 | Zhang ................ G06F 16/283 |
| | | 707/E17.056 |
| 2015/0120645 A1* | 4/2015 | Varakur ............. G06F 16/2379 |
| | | 707/607 |
| 2016/0350372 A1 | 12/2016 | Liu |

FOREIGN PATENT DOCUMENTS

| | | |
|---|---|---|
| CN | 103092970 A | 5/2013 |
| CN | 103345502 A | 10/2013 |
| CN | 103500180 A | 1/2014 |
| CN | 103514028 A | 1/2014 |
| CN | 104199831 A | 12/2014 |
| CN | 104331457 A | 2/2015 |
| CN | 106055322 A | 10/2016 |
| CN | 106547781 A | 3/2017 |
| CN | 107122357 A | 9/2017 |
| CN | 107403104 A | 11/2017 |
| CN | 107784032 A | 3/2018 |
| EP | 1 649 390 | 4/2006 |
| JP | 2003-526159 A | 9/2003 |
| JP | 2017-529632 A | 10/2017 |
| WO | 2017050148 A | 3/2017 |

OTHER PUBLICATIONS

Kemper et al., HyPer: A Hybrid OLTP&OLAP Main Memory Database System Based on Virtual Memory Snapshots, ICDE Conference 2011, pp. 195-206. (Year: 2011).*
International Search Report for corresponding Application No. PCT/CN2019/073233, dated Apr. 16, 2019.
Written Opinion for corresponding Application No. PCT/CN2019/073233, dated Apr. 16, 2019.
1st Office Action for corresponding Chinese Patent Application 201810273942.5, dated Feb. 27, 2020.
2nd Office Action for corresponding Chinese Patent Application 201810273942.5, dated Aug. 5, 2020.

* cited by examiner

TRANSACTION PROCESSING METHOD AND SYSTEM, AND SERVER

The present application is a national phase entry under 35 U.S.C. § 371 of International Application No. PCT/CN2019/073233, filed on Jan. 25, 2019, which claims priority of Chinese Patent Application No. 201810273942.5, filed with the China National Intellectual Property Administration (CNIPA) on Mar. 29, 2018 and entitled "Transaction Processing Method, Server and Transaction Processing System", the entire content of which is incorporated herein by reference.

FIELD

The invention relates to the field of communication technology, and in particular to a transaction processing method, a server and a transaction processing system.

BACKGROUND

With the rapid development of the Internet, the amount of data and visits of a single database has grown rapidly. The distributed database can effectively solve the problem of massive data storage and concurrent data access. The distributed database system in the prior art includes at least one database, and each database includes at least one data table. In this way, the data in the original centralized database can be distributed and stored to multiple data storage nodes connected through the network, to obtain the larger storage capacity and higher concurrent visits.

At present, the distributed database in the prior art uses the same server to process different types of data access requirements, and the different types of data access requirements may include the access requirement of a single database, that is, this data access requirement requires the server to query one database to get the result; there may also be the access requirement of multiple databases, that is, this data access requirement requires the server to query multiple databases to get the result. The processing time periods required by these two types of data access requirements are different, which easily leads to the lower efficiency of the server in processing the data access requirements and increases the operating burden of the server.

Based on this, there is an urgent need for a transaction processing method to solve the problem in the prior art that the processing efficiency of the server is low because the distributed database uses the same server to process different types of transaction access requirements.

BRIEF SUMMARY

Embodiments of the invention provide a transaction processing method, a server and a transaction processing system, so as to solve the technical problem in the prior art that the processing efficiency of the server is low because the distributed database uses the same server to process different types of transaction access requirements.

In a first aspect, embodiments of the invention provide a transaction processing method, which includes: obtaining, by a first node, at least one statement of a first transaction; determining, by the first node, a type of a first statement, wherein the first statement is any one of the at least one statement; sending, by the first node, the first statement to a second node corresponding to the type of the first statement among at least one second node according to the type of the first statement, so that the second node corresponding to the type of the first statement generates an execution plan corresponding to the first statement according to the first statement; and receiving, by the first node, an execution plan corresponding to the at least one statement of the first transaction sent by the at least one second node; and processing, by the first node, the first transaction according to the execution plan corresponding to the at least one statement of the first transaction.

In this way, since there is at least one second node in the transaction processing system, after obtaining at least one statement of the first transaction, the first node may determine the type(s) of the at least one statement and send the at least one statement to the corresponding second node(s). Compared with the mode in which only one server is used for transaction processing in the prior art, embodiments of the invention can process multiple types of statements at the same time, effectively improving the processing efficiency of the system and reducing the operating burden of the system; further, at least one second node only needs to send the execution plan(s) corresponding to the statement(s) to the first node, and the first node performs unified processing on at least one statement included in the first transaction, thereby ensuring the transactionality.

Optionally, said processing, by the first node, the first transaction according to the execution plan corresponding to the at least one statement of the first transaction, includes: starting, by the first node, the first transaction and allocating a scheduler corresponding to the first transaction according to the execution plan corresponding to the at least one statement of the first transaction; and processing, by the first node, the first transaction through the scheduler corresponding to the first transaction according to the execution plan corresponding to the at least one statement of the first transaction.

In this way, multiple transactions can be processed concurrently, improving the processing efficiency of the transaction processing system and ensuring the transactionality.

Optionally, the at least one second node includes an Online Transaction Processing (OLTP) node and an Online Analytical Processing (OLAP) node; and said receiving, by the first node, the execution plan corresponding to the at least one statement of the first transaction sent by the at least one second node, and said processing, by the first node, the first transaction according to the execution plan corresponding to the at least one statement of the first transaction, includes: receiving, by the first node, an execution plan corresponding to a first-type statement of the first transaction sent by the OLTP node; when the execution plan corresponding to the first-type statement comprises execution content corresponding to the first-type statement, processing, by the first node, the first transaction according to the execution content corresponding to the first-type statement; when the execution plan corresponding to the first-type statement comprises the execution content and a storage node corresponding to the first-type statement, accessing, by the first node, the storage node corresponding to the first-type statement according to the execution content corresponding to the first-type statement; receiving, by the first node, an execution plan corresponding to a second-type statement of the first transaction sent by the OLAP node, wherein the execution plan corresponding to the second-type statement comprises execution content and a storage node corresponding to the second-type statement; and accessing, by the first node, the storage node corresponding to the second-type statement according to the execution content corresponding to the second-type statement.

In this way, since the OLTP node is responsible for processing the first-type statement and the OLAP node is responsible for processing the second-type statement, embodiments of the invention can process multiple types of statements at the same time, effectively improving the processing efficiency of the system and reducing the operating burden of the system.

Optionally, the at least one second node includes an OLTP node; and said receiving, by the first node, the execution plan corresponding to the at least one statement of the first transaction sent by the at least one second node, includes: receiving, by the first node, the execution plan corresponding to the at least one statement of the first transaction sent by the OLTP node, wherein the execution plan corresponding to the at least one statement of the first transaction comprises an execution plan corresponding to a first-type statement of the first transaction and an execution plan corresponding to a second-type statement of the first transaction; wherein the execution plan corresponding to the first-type statement is generated by the OLTP node according to the first-type statement; and the execution plan corresponding to the second-type statement is generated by the OLTP node according to a received initial execution plan corresponding to the second-type statement sent by an OLAP node; the initial execution plan corresponding to the second-type statement comprises execution content corresponding to the second-type statement, and the execution plan corresponding to the second-type statement comprises the execution content and a storage node corresponding to the second-type statement.

In this way, the OLAP node does not need to consider the storage rule of the distributed database (that is, not need to consider the storage node corresponding to each data list), and only needs to consider the internal logical relationship of each data list; while the OLTP node needs to integrate the storage rule of the distributed database with the internal logical relationship of each data list, thereby simplifying the structure of the OLAP node, reducing the complexity of the transaction processing system, and then reducing the implementation cost of the transaction processing system.

Optionally, the first node and the OLTP node are arranged in a same device.

In this way, the problem of increased operating cost that is easily caused by the respective arrangement of each node in one device can be avoided, and the system complexity can be reduced.

In a second aspect, embodiments of the invention provide a transaction processing method, which includes: receiving, by an OLAP node, a statement of a first transaction sent by a first node; generating, by the OLAP node, an initial execution plan corresponding to the statement that includes execution content corresponding to the statement; and sending, by the OLAP node, the initial execution plan corresponding to the statement to an OLTP node, so that the OLTP node generates an execution plan corresponding to the statement according to the initial execution plan corresponding to the statement.

In this way, the OLAP node does not need to consider the storage rule of the distributed database (that is, not need to consider the storage node corresponding to each data list), and only needs to consider the internal logical relationship of each data list, thereby simplifying the structure of the OLAP node, reducing the complexity of the transaction processing system, and then reducing the implementation cost of the transaction processing system.

In a third aspect, embodiments of the invention provide a transaction processing method, which includes: receiving, by an OLTP node, an initial execution plan corresponding to a statement of a first transaction sent by an OLAP node, wherein the initial execution plan corresponding to the statement includes execution content corresponding to the statement; obtaining, by the OLTP node, a storage node corresponding to the statement according to the initial execution plan corresponding to the statement; and generating, by the OLTP node, an execution plan corresponding to the statement; wherein the execution plan corresponding to the statement includes the execution content and the storage node corresponding to the statement; and sending, by the OLTP node, the execution plan corresponding to the statement to a first node, so that the first node processes the first transaction according to the execution plan corresponding to the statement.

In this way, the OLTP node only needs to integrate the storage rule of the distributed database with the internal logical relationship of each data list, thereby reducing the complexity of the transaction processing system, and then reducing the implementation cost of the transaction processing system.

In a fourth aspect, embodiments of the invention provide a transaction management and execution server, which includes: an obtaining unit configured to obtain at least one statement of a first transaction; a processing unit configured to determine a type of a first statement, the first statement being any one of the at least one statement; and send the first statement to a second node corresponding to the type of the first statement among at least one second node according to the type of the first statement, so that the second node corresponding to the type of the first statement generates an execution plan corresponding to the first statement according to the received first statement; and a receiving unit configured to receive an execution plan corresponding to the at least one statement of the first transaction sent by the at least one second node; where the processing unit is further configured to process the first transaction according to the execution plan corresponding to the at least one statement of the first transaction.

Optionally, the processing unit is specifically configured to: start the first transaction and allocate a scheduler corresponding to the first transaction according to the execution plan corresponding to the at least one statement of the first transaction; and process the first transaction through the scheduler corresponding to the first transaction according to the execution plan corresponding to the at least one statement of the first transaction.

Optionally, the at least one second node includes an OLTP node and an OLAP node; and the processing unit is configured to: when an execution plan corresponding to a first-type statement includes execution content corresponding to the first-type statement, process the first transaction according to the execution content corresponding to the first-type statement; when the execution plan corresponding to the first-type statement includes the execution content and a storage node corresponding to the first-type statement, access the storage node corresponding to the first-type statement according to the execution content corresponding to the first-type statement; and access a storage node corresponding to a second-type statement according to execution content corresponding to the second-type statement; wherein an execution plan corresponding to the second-type statement includes the execution content and storage node corresponding to the second-type statement.

Optionally, the at least one second node includes an OLTP node; and the receiving unit is configured to: receive the execution plan corresponding to the at least one statement of the first transaction sent by the OLTP node, wherein the execution plan corresponding to the at least one statement of the first transaction includes an execution plan corresponding to a first-type statement of the first transaction and an execution plan corresponding to a second-type statement of the first transaction; wherein the execution plan corresponding to the first-type statement is generated by the OLTP node according to the first-type statement; and the execution plan corresponding to the second-type statement is generated by the OLTP node according to a received initial execution plan corresponding to the second-type statement sent by an OLAP node; the initial execution plan corresponding to the second-type statement includes execution content corresponding to the second-type statement, and the execution plan corresponding to the second-type statement includes the execution content and a storage node corresponding to the second-type statement.

In a fifth aspect, embodiments of the invention provide an OLAP server, which includes:

a receiving unit configured to receive a statement of a first transaction sent by a first node; a processing unit configured to generate an initial execution plan corresponding to the statement that includes execution content corresponding to the statement; and a sending unit configured to send the initial execution plan corresponding to the statement to an OLTP node, so that the OLTP node generates an execution plan corresponding to the statement according to the initial execution plan corresponding to the statement.

In a sixth aspect, embodiments of the invention provide an OLTP server, which includes:

a receiving unit configured to receive an initial execution plan corresponding to a statement of a first transaction sent by an OLAP node, wherein the initial execution plan corresponding to the statement includes execution content corresponding to the statement; a processing unit configured to obtain a storage node corresponding to the statement according to the initial execution plan corresponding to the statement, and generate an execution plan corresponding to the statement; wherein the execution plan corresponding to the statement includes the execution content and the storage node corresponding to the statement; and a sending unit configured to send the execution plan corresponding to the statement to a first node, so that the first node processes the first transaction according to the execution plan corresponding to the statement.

In a seventh aspect, embodiments of the invention provide a server, which includes: a memory configured to store a software program; a processor configured to read the software program in the memory and perform the transaction processing method described above.

In an eighth aspect, embodiments of the invention provide an electronic device, including: a processor, a memory, a transceiver and a bus interface, wherein the processor, the memory, the transceiver and the bus interface are connected through buses;

the processor is configured to read a program in the memory to perform following operations: obtaining at least one statement of a first transaction; determining a type of a first statement, wherein the first statement is any one of the at least one statement; and sending the first statement to a second node corresponding to the type of the first statement among at least one second node according to the type of the first statement, so that the second node corresponding to the type of the first statement generates an execution plan corresponding to the first statement according to the first statement; and processing the first transaction according to an execution plan corresponding to the at least one statement of the first transaction;

the transceiver is configured to receive the execution plan corresponding to the at least one statement of the first transaction sent by the at least one second node.

Optionally, the processor is configured to: start the first transaction and allocate a scheduler corresponding to the first transaction according to the execution plan corresponding to the at least one statement of the first transaction; and process the first transaction through the scheduler corresponding to the first transaction according to the execution plan corresponding to the at least one statement of the first transaction.

Optionally, the at least one second node includes an OLTP node and an OLAP node; and the processor is configured to: when an execution plan corresponding to a first-type statement comprises execution content corresponding to the first-type statement, process the first transaction according to the execution content corresponding to the first-type statement; when the execution plan corresponding to the first-type statement comprises the execution content and a storage node corresponding to the first-type statement, access the storage node corresponding to the first-type statement according to the execution content corresponding to the first-type statement; and access a storage node corresponding to a second-type statement according to execution content corresponding to the second-type statement; wherein an execution plan corresponding to the second-type statement comprises the execution content and the storage node corresponding to the second-type statement.

Optionally, the at least one second node includes an OLTP node; and the transceiver is configured to:

receive the execution plan corresponding to the at least one statement of the first transaction sent by the OLTP node, wherein the execution plan corresponding to the at least one statement of the first transaction comprises an execution plan corresponding to a first-type statement of the first transaction and an execution plan corresponding to a second-type statement of the first transaction; wherein the execution plan corresponding to the first-type statement is generated by the OLTP node according to the first-type statement; and the execution plan corresponding to the second-type statement is generated by the OLTP node according to a received initial execution plan corresponding to the second-type statement sent by an OLAP node; the initial execution plan corresponding to the second-type statement comprises execution content corresponding to the second-type statement, and the execution plan corresponding to the second-type statement comprises the execution content and a storage node corresponding to the second-type statement.

In a ninth aspect, embodiments of the invention provide an electronic device, including: a processor, a memory, a transceiver and a bus interface, wherein the processor, the memory, the transceiver and the bus interface are connected through buses;

the transceiver is configured to receive a statement of a first transaction sent by a first node; and send an initial execution plan corresponding to the statement to an OLTP node, so that the OLTP node generates an execution plan corresponding to the statement according to the initial execution plan corresponding to the statement;

the processor is configured to generate the initial execution plan corresponding to the statement that includes execution content corresponding to the statement.

In a tenth aspect, embodiments of the invention provide an electronic device, including: a processor, a memory, a transceiver and a bus interface, wherein the processor, the memory, the transceiver and the bus interface are connected through buses;

the transceiver is configured to receive an initial execution plan corresponding to a statement of a first transaction sent by an OLAP node, wherein the initial execution plan corresponding to the statement includes execution content corresponding to the statement; and send an execution plan corresponding to the statement to a first node, so that the first node processes the first transaction according to the execution plan corresponding to the statement;

the processor is configured to obtain a storage node corresponding to the statement according to the initial execution plan corresponding to the statement, and generate the execution plan corresponding to the statement; wherein the execution plan corresponding to the statement includes the execution content and the storage node corresponding to the statement.

In an eleventh aspect, embodiments of the invention provide a transaction processing system, which includes: a transaction management and execution server, an OLTP server and an OLAP server;

the transaction management and execution server is configured to: obtain at least one statement of a first transaction; determine a type of a first statement, wherein the first statement is any one of the at least one statement; and send the first statement to the OLTP server or the OLAP server according to the type of the first statement; the OLTP server is configured to: receive a first-type statement of the first transaction sent by the transaction management and execution server; generate an execution plan corresponding to the first-type statement according to the first-type statement; and send the execution plan corresponding to the first-type statement to the transaction management and execution server; the OLAP server is configured to: receive a second-type statement of the first transaction sent by the transaction management and execution server; generate an execution plan corresponding to the second-type statement according to the second-type statement; and send the execution plan corresponding to the second-type statement to the transaction management and execution server; and the transaction management and execution server is further configured to: receive an execution plan corresponding to the at least one statement of the first transaction sent by the OLTP server and the OLAP server, and process the first transaction according to the execution plan corresponding to the at least one statement of the first transaction.

In a twelfth aspect, embodiments of the invention provide a transaction processing system, which includes: an OLTP server and an OLAP server; where the OLTP server is configured to: obtain at least one statement of a first transaction; determine a type of a first statement, wherein the first statement is any one of the at least one statement; generate an execution plan corresponding to a first-type statement when the first statement is determined as the first-type statement, and send a second-type statement to the OLAP server when the first statement is determined as the second-type statement; wherein the first statement is any one of the at least one statement; the OLAP server is configured to: receive the second-type statement sent by the OLTP server; generate an initial execution plan corresponding to the second-type statement; and send the initial execution plan corresponding to the second-type statement to the OLTP server; and the OLTP server is further configured to: receive the initial execution plan corresponding to the second-type statement sent by the OLAP server; generate an execution plan corresponding to the second-type statement according to the initial execution plan corresponding to the second-type statement; and process the first transaction according to the execution plan corresponding to the first-type statement and the execution plan corresponding to the second-type statement.

In a thirteenth aspect, embodiments of the present application provide a non-transitory computer readable storage medium storing instructions, which cause a computer to perform the method in the first aspect or in any possible implementation of the first aspect when running on the computer, or cause a computer to perform the method in the second aspect or in any possible implementation of the second aspect when running on the computer, or cause a computer to perform the method in the third aspect or in any possible implementation of the third aspect when running on the computer.

In a fourteenth aspect, embodiments of the present application provide a computer program product containing instructions, which cause a computer to perform the method in the first aspect or in any possible implementation of the first aspect when running on the computer, or cause a computer to perform the method in the second aspect or in any possible implementation of the second aspect when running on the computer, or cause a computer to perform the method in the third aspect or in any possible implementation of the third aspect when running on the computer.

In embodiments of the invention, after obtaining at least one statement of the first transaction, the first node may classify each statement and send the at least one statement to at least one second node respectively according to the type to which each statement belongs, so that the at least one second node generates the execution plan corresponding to the statement according to the received statement; and then the first node may process the first transaction according to the received execution plan corresponding to at least one statement of the first transaction sent by the at least one second node. In this way, since there is at least one second node in the transaction processing system, after obtaining at least one statement of the first transaction, the first node may classify and then send at least one statement to at least one second node. This method of classifying and processing statements can reduce the design complexity of the statement system; further, compared with the mode in which only one server is used for transaction processing in the prior art, embodiments of the invention can process multiple types of statements at the same time, effectively improving the processing performance of the system, reducing the operating burden of the system, and then increasing the overall parallelism of the system; and furthermore, at least one second node only needs to send the execution plan corresponding to the statement to the first node, and the first node performs unified processing on at least one statement included in the first transaction, thereby ensuring the transactionality.

BRIEF DESCRIPTION OF THE DRAWINGS

In order to illustrate the technical solutions in embodiments of the invention more clearly, the accompanying figures which need to be used in describing the embodiments will be introduced below briefly. Obviously the accompanying figures described below are only some embodiments of the invention, and other accompanying figures can also be obtained by those ordinary skilled in the art according to these accompanying figures without creative labor.

DETAILED DESCRIPTION OF THE EMBODIMENTS

In order to make the objects, technical solutions and beneficial effects of the invention clearer, the invention will further be illustrated below in details with reference to the drawings and the embodiments. It should be understood that the specific embodiments described herein are only used to explain the invention but not to limit the invention.

In order to make the objects, technical solutions and advantages of the invention clearer, the invention will be further illustrated below in details with reference to the accompanying drawings. Obviously the described embodiments are a part of the embodiments of the invention but not all the embodiments. Based upon the embodiments of the invention, all of other embodiments obtained by those ordinary skilled in the art without creative work pertain to the protection scope of the invention.

The method in embodiments of the invention may be applicable to a variety of system architectures. The method in embodiments of the invention will be described in detail below in combination with the system architectures given as examples in the first and second embodiments respectively.

First Embodiment

Figure 1:
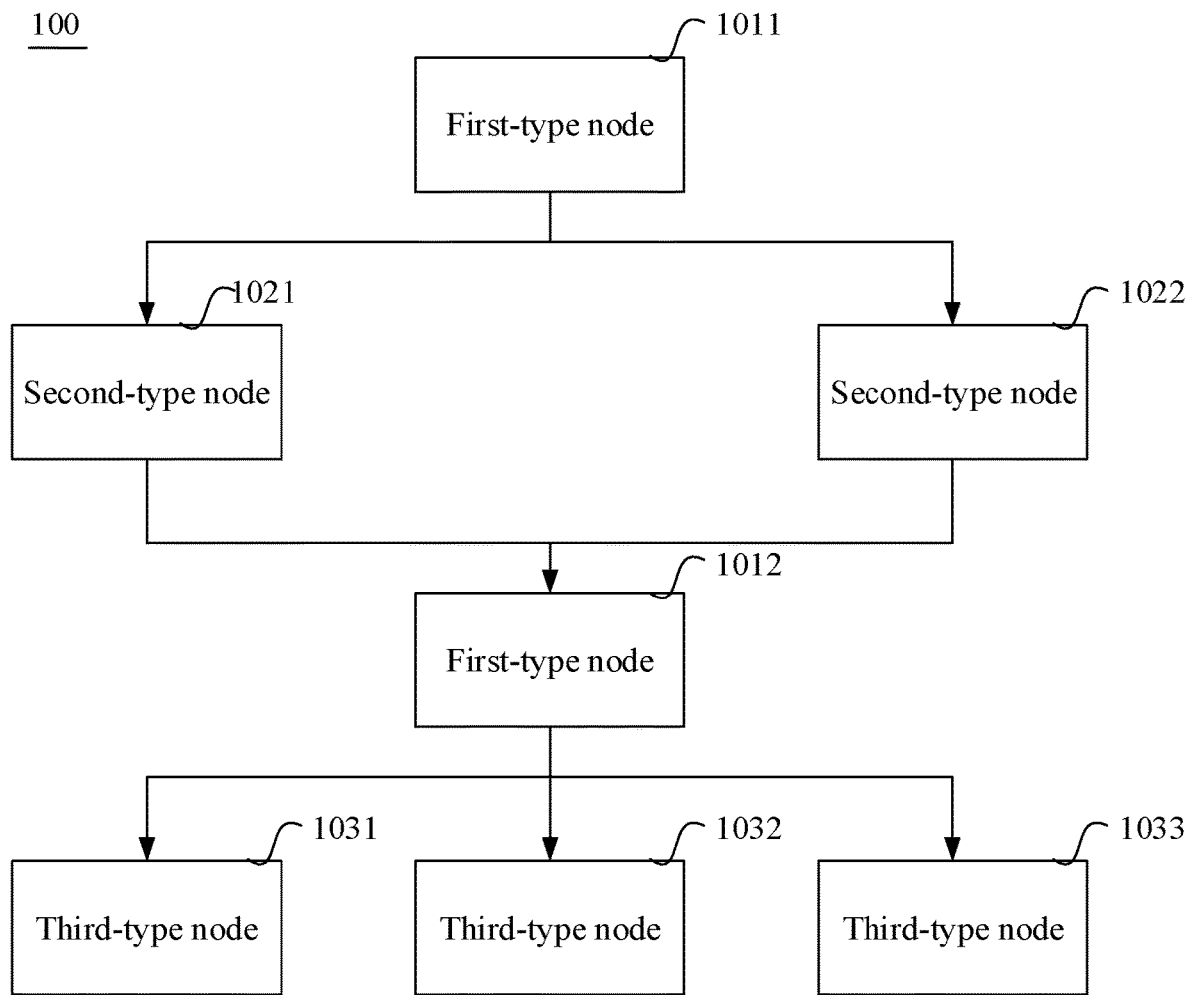
FIG. 1 is a schematic diagram of a system architecture applicable to an embodiment of the invention.

FIG. 1 exemplarily shows a schematic diagram of a system architecture applicable to an embodiment of the invention. As shown in FIG. 1, the system architecture 100 applicable to the embodiment of the invention includes: first-type nodes, such as a first-type node 1011 and a first-type node 1012 as shown in FIG. 1; second-type nodes, such as a second-type node 1021 and a second-type node 1022 as shown in FIG. 1; and third-type nodes, such as a third-type node 1031, a third-type node 1032 and a third-type node 1033 as shown in FIG. 1, wherein the third-type node may be a database for storing data.

In a specific implementation process, the first-type node 1011 may obtain at least one statement of a certain transaction and classify each statement of the transaction, and then send the at least one statement to the second-type node 1021 and the second-type node 1022 respectively according to the type to which each statement belongs; further, after receiving the statement, the second-type node 1021 or the second-type node 1022 may generate the execution plan corresponding to the statement according to the received statement and send the execution plan corresponding to the statement to the first-type node 1012; and further, the first-type node 1012 may process the transaction according to the received execution plan corresponding to at least one statement of the transaction sent by the second-type node 1021 and/or the second-type node 1022.

The nodes in the embodiments of the invention may be physical entity nodes, or may be virtual nodes, which are not limited here.

It should be noted that: (1) the first-type nodes can be deployed on different devices, for example, the first-type node 1011 shown in FIG. 1 is deployed on the device A and the first-type node 1012 is deployed on the device B; or the first-type nodes may also be deployed on the same device, for example, the first-type node 1011 and the first-type node 1012 shown in FIG. 1 are both deployed on the device A; (2) the number of second-type nodes is not specifically limited in the embodiments of the invention, the second-type node 1021 and the second-type node 1022 shown in FIG. 1 are just an example, and those skilled in the art can increase/decrease the number of second-type nodes according to the experience and actual condition; (3) the number of third-type nodes is not specifically limited in the embodiments of the invention, the third-type node 1031, the third-type node 1032 and the third-type node 1033 shown in FIG. 1 are just an example, and those skilled in the art can increase/decrease the number of third-type nodes according to the experience and actual condition.

Figure 2:
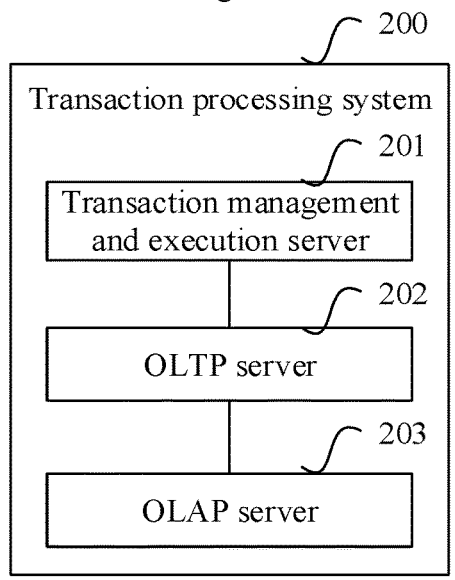
FIG. 2 is a structural schematic diagram of a transaction processing system provided by an embodiment of the invention.

In order to describe the system architecture shown in FIG. 1 more clearly, the system architecture described in FIG. 1 will be exemplified below in combination with FIG. 2. As shown in FIG. 2, it is a structural schematic diagram of a transaction processing system provided by an embodiment of the invention. The transaction processing system 200 includes a transaction management and execution server 201, an OLTP server 202 and an OLAP server 203; wherein:

the transaction management and execution server 201 is configured to: obtain at least one statement of a first transaction; determine a type of a first statement, the first statement being any one of the at least one statement, and send the first statement to the OLTP server 202 or the OLAP server 203 according to the type of the first statement;

the OLTP server 202 is configured to: receive a first-type statement of the first transaction sent by the transaction management and execution server, generate an execution plan corresponding to the first-type statement according to the first-type statement, and send the execution plan corresponding to the first-type statement to the transaction management and execution server. The OLAP server 203 is configured to: receive a second-type statement of the first transaction sent by the transaction management and execution server, generate an execution plan corresponding to the second-type statement according to the second-type statement, and send the execution plan corresponding to the second-type statement to the transaction management and execution server.

The transaction management and execution server 201 is further configured to: receive an execution plan corresponding to the at least one statement of the first transaction sent by the at least one second node, and process the first transaction according to the execution plan corresponding to the at least one statement of the first transaction.

It should be noted that: (1) in the transaction processing system shown in FIG. 2, the transaction management and execution server 201 may have the functions of multiple first-type nodes, for example, the transaction management and execution server 201 may have both the function of the first-type node 1011 and the function of the first-type node 1012 shown in FIG. 1; (2) in the transaction processing system shown in FIG. 2, the OLTP server 202 may be any one of the second-type nodes shown in FIG. 1, for example, the OLTP server 202 may be the second-type node 1021, and the OLAP server 203 may be any one of the second-type nodes shown in FIG. 1 other than the OLTP server, for example, the OLAP server 203 may be the second-type node 1022.

Figure 3:
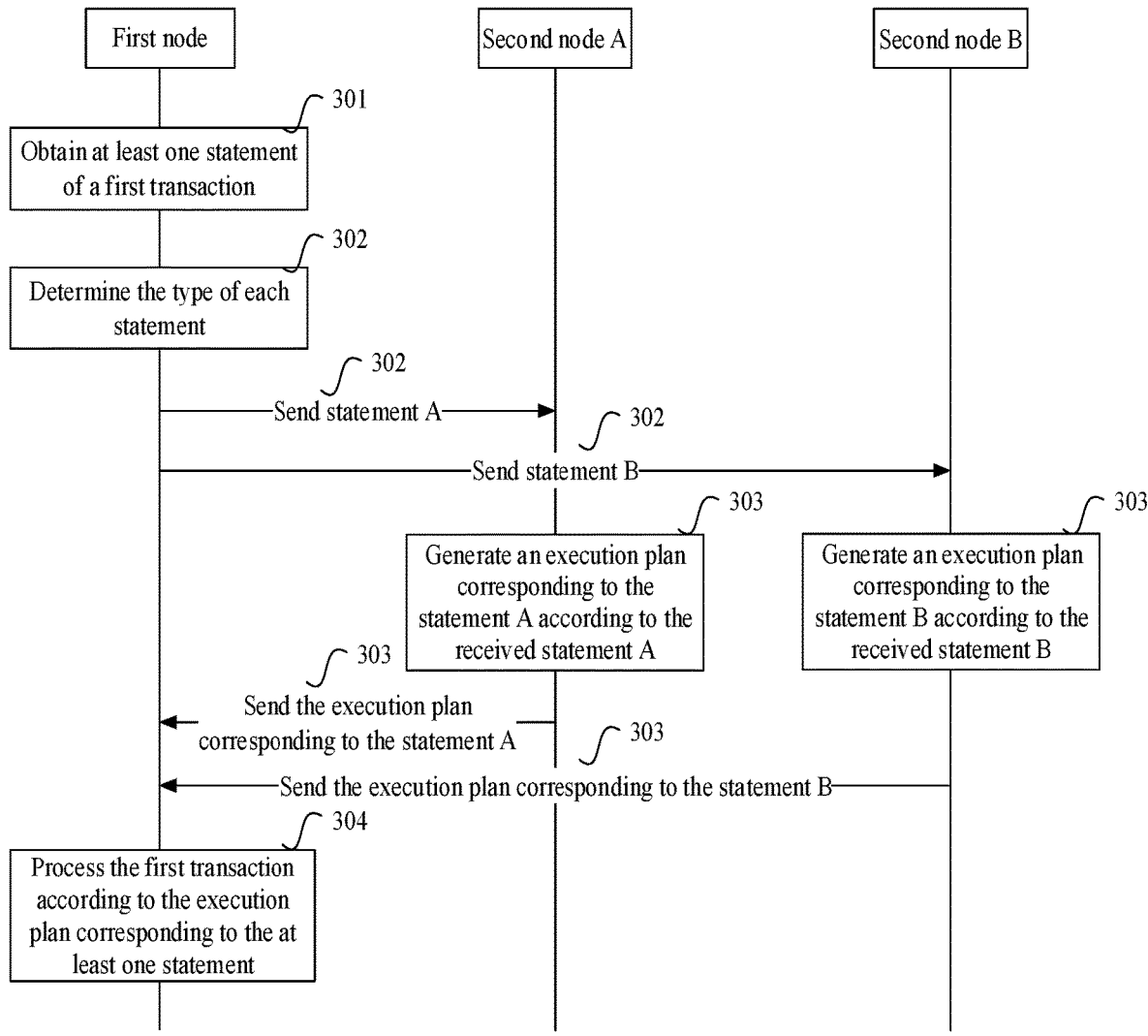
FIG. 3 is a flow schematic diagram of a transaction processing method provided by an embodiment of the invention.

Based on the system architecture shown in FIG. 1, FIG. 3 exemplarily shows a flow schematic diagram corresponding to a transaction processing method provided by an embodiment of the invention, wherein the first node may be the transaction management and execution server 201 shown in FIG. 2. The method specifically includes the following steps.

Step 301: the first node obtains at least one statement of a first transaction.

Step 302: the first node determines a type of a first statement and sends the first statement to a second node corresponding to the type of the first statement among at least one second node according to the type of the first statement.

Step 303: at least one second node generates an execution plan corresponding to a received statement according to the received statement, and sends the execution plan corresponding to the received statement to the first node.

Step 304: the first node receives the execution plan corresponding to the at least one statement of the first transaction sent by the at least one second node, and processes the first transaction according to the execution plan corresponding to the at least one statement of the first transaction.

It should be noted that there are multiple implementations of the content described in the above steps. One possible implementation is as follows: taking the system architecture shown in FIG. 1 as an example, the above steps 301 and 302 may be performed by the first-type node 1011 shown in FIG. 1, the above step 303 may be performed by at least one of the second-type nodes shown in FIG. 1, and the above step 304 may be performed by the first-type node 1012 shown in FIG. 1; another possible implementation is as follows: taking the system architecture shown in FIG. 2 as an example, the above steps 301, 302 and 304 may be performed by the transaction management server 201 shown in FIG. 2, and the above step 303 may be performed by the OLTP server and/or the OLAP server shown in FIG. 2.

In this way, since there is at least one second node in the transaction processing system, after obtaining at least one statement of the first transaction, the first node may classify and then send at least one statement to at least one second node. This method of classifying and processing statements can reduce the design complexity of the statement system; further, compared with the mode in which only one server is used for transaction processing in the prior art, the embodiments of the invention can process multiple types of statements at the same time, effectively improving the processing performance of the system, reducing the operating burden of the system, and then increasing the overall parallelism of the system; and furthermore, at least one second node only needs to send the execution plan corresponding to the statement to the first node, and the first node performs unified processing on at least one statement included in the first transaction, thereby ensuring the transactionality.

Specifically, in step 301, the first transaction may include at least one statement. For example, the business scenario corresponding to the first transaction is: the educational administration system of a university needs to update the GPA of a student enrolled in 2004 and numbered 200401361211 to 3.9; then the name of the student's teacher is searched out for the purpose of instructing the teacher to confirm the student's GPA score; and it is known that there are two data tables in the database of the educational administration system of the university. Table 1 is a teacher list (teacher_list), where the primary key is teacher ID (teacher_id), and the other field is teacher name (name); and Table 2 is a student list (student_list), where the primary key is student ID (student_id), and the other fields are student name (name), teacher ID corresponding to student (teacher_id), and Grade Point Average (GPA). Based on this business scenario, as shown in Table 1, it shows the statements of the first transaction (taking SQL statements as an example).

TABLE 1

Statements of the first transaction
(taking SQL statements as an example)

| Execution order | Statement | Statement description |
|---|---|---|
| 1 | begin; | Start the first transaction |
| 2 | update student_list<br>set gpa = 3.9<br>where<br>student_id = '200401361211'; | Update the GPA of a student numbered 200401361211 |
| 3 | select s.name, s.gpa, t.name<br>from teacher list as t,<br>student_list as s<br>where<br>s.student_id = '200401361211'<br>and<br>s.teacher_id = t.teacher_id; | Search for the name of the teacher of the student |
| 4 | commit; | Submit the first transaction |

Based on the content shown in Table 1, it can be seen that the first transaction includes 4 statements, namely: statement 1: begin; statement 2: update student_list//set gpa=3.9// where//student_id='200401361211'; statement 3: select s.name, s.gpa, t.name//from teacher_list as t//student_list as s//where//s.student_id='200401361211'//and// s.teacher_id=t.teacher_id; and statement 4: commit.

In step 302, there may be multiple methods for classifying the statements. One possible implementation is to classify the statements according to the degree of difficulty in executing the statements. Taking the content shown in Table 1 as an example, the statement 1, statement 2 and statement 4 are executed with fewer steps and lower degree of difficulty, and the statement 1, statement 2 and statement 4 may be classified as the first-type statements; and the statement 3 is executed with more steps and higher degree of difficulty, and the statement 3 may be classified as the second-type statement. By analogy, when the first transaction includes more statements, the statements may also be divided into more types (that is, the number of types is greater than two).

It should be noted that the degrees of difficulty in executing the statements described above can be set by those skilled in the art based on the experience and actual conditions, which are not specifically limited.

In other possible embodiments, when the statements are classified, they may also be classified in other ways, for example, they may be classified according to the content of the statements or according to the execution order of the statements, which is not specifically limited.

Further, there may be a correspondence between types of the statements and second nodes. Thus, the first node may send at least one statement to at least one second node respectively according to the type of each statement and the correspondence between types of the statements and second nodes. As shown in Table 2, it is an example of the correspondence between types of statements and second nodes, wherein the second nodes includes an OLTP node and an OLAP node. If the type of the statement is the first-type statement, the corresponding second node is the OLTP node, and if the type of the statement is the second-type statement, the corresponding second node is the OLAP node.

TABLE 2 an example of the correspondence between types of the statements and second nodes

| Type of statement | Second node |
| --- | --- |
| First-type statement | OLTP node |
| Second-type statement | OLAP node |

According to the content described in Table 2, the embodiment of the invention can classify the statements of the first transaction shown in Table 1 and send them to the corresponding second nodes, where the statement 1, statement 2 and statement 4 may be the first-type statements, and the first node may send the statement 1, statement 2 and statement 4 to the OLTP node; and the statement 3 may be the second-type statement, and the first node may send the statement 3 to the OLAP node.

In steps 303 and 304, different second nodes correspond to different types of statements. In the following, the second nodes include an OLTP node and an OLAP node as an example for description.

In a specific implementation process, after the first node receives the execution plan corresponding to the first-type statement of the first transaction sent by the OLTP node, if it is determined that the execution plan corresponding to the first-type statement includes the execution content corresponding to the first-type statement, then the first node may process the first transaction according to the execution content corresponding to the first-type statement; if it is determined that the execution plan corresponding to the first-type statement includes the execution content and the storage node corresponding to the first-type statement, then the first node may access the storage node corresponding to the first-type statement according to the execution content corresponding to the first-type statement.

After receiving the execution plan corresponding to the second-type statement of the first transaction sent by the OLAP node, the first node may access the storage node corresponding to the second-type statement included in the execution plan corresponding to the second-type statement according to the execution content corresponding to the second-type statement included in the execution plan corresponding to the second-type statement.

Figure 4:
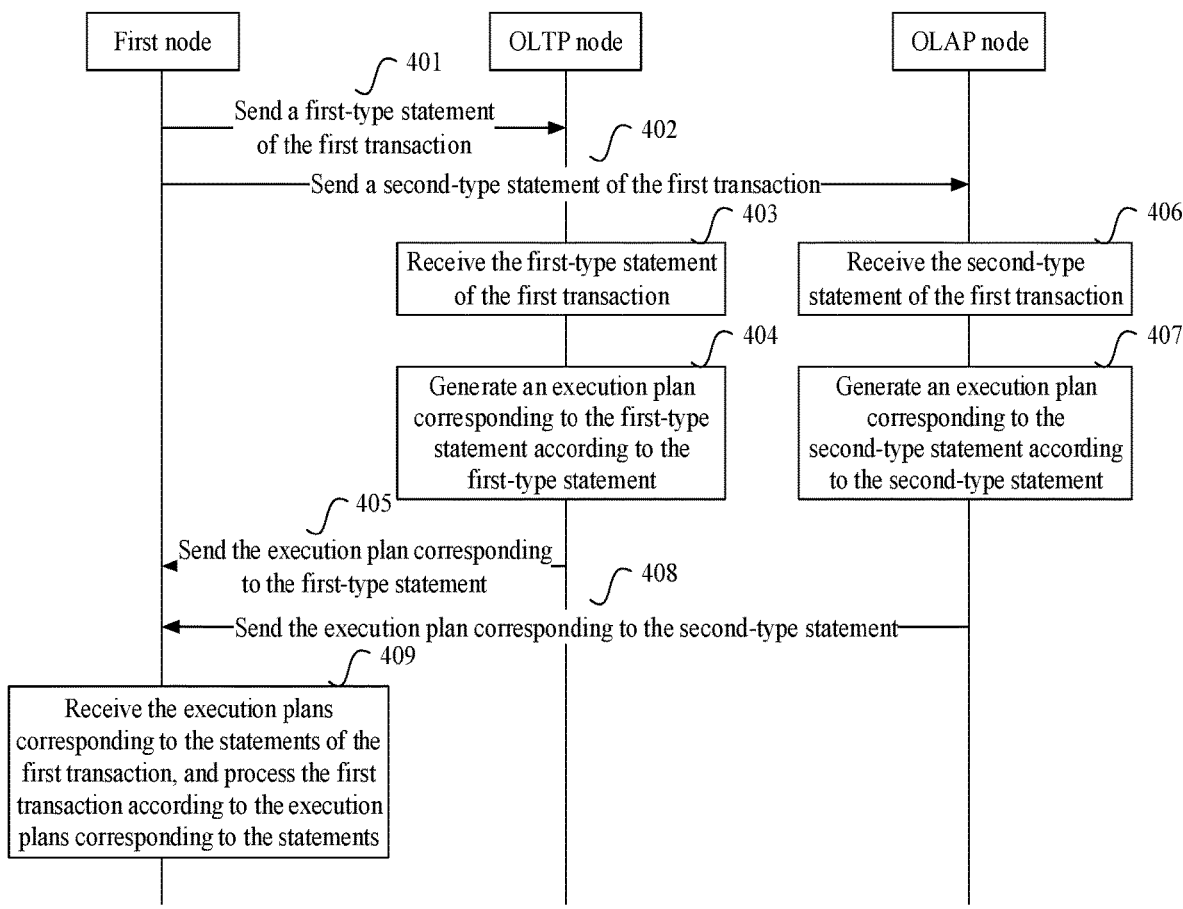
FIG. 4 is a flow schematic diagram corresponding to a second node being an OLTP node involved in an embodiment of the invention.

In order to describe the implementation process described above more clearly, the flow corresponding to the second node being the OLTP node involved in the embodiment of the invention will be specifically illustrated below with reference to FIG. 4, and includes the following steps.

Step 401: the first node sends a first-type statement of the first transaction to the OLTP node.

Step 402: the first node sends a second-type statement of the first transaction to the OLAP node.

Step 403: the OLTP node receives the first-type statement of the first transaction sent by the first node.

Step 404: the OLTP node generates an execution plan corresponding to the first-type statement of the first transaction according to the first-type statement of the first transaction.

Specifically, in an example, the execution plan corresponding to the first-type statement may only include the execution content corresponding to the first-type statement. For example, taking the statement 1 shown in Table 1 as an example, the statement 1 is 'begin'. According to the statement 1, the OLTP node may know that the first transaction needs to be started. Then, the OLTP node may generate an execution plan corresponding to the statement 1, that is, the execution content included in the execution plan corresponding to the statement 1 is starting the first transaction.

In another example, the execution plan corresponding to the first-type statement may also include both the execution content corresponding to the first-type statement and the storage node corresponding to the first-type statement. For example, taking the statement 2 shown in Table 1 as an example, the statement 2 is update student_list//set gpa=3.9//where//student_id='200401361211'. According to the statement 2 and the preset storage rule, the OLTP node may know that the data corresponding to the student number 200401361211 is stored in the storage node a, and then the OLTP node may generate the execution plan corresponding to the statement 2, that is, the execution content included in the execution plan corresponding to the statement 2 is searching for the data corresponding to the student number 200401361211, and the storage node included in the execution plan corresponding to the statement 2 is the storage node a. In this way, after receiving this execution plan, the first node may process the first transaction by searching for the data corresponding to the student number 200401361211 in the storage node a.

Step 405: the OLTP node sends the execution plan corresponding to the first-type statement of the first transaction to the first node.

Step 406: the OLAP node receives the second-type statement of the first transaction sent by the first node.

Step 407: the OLAP node generates an execution plan corresponding to the second-type statement of the first transaction according to the second-type statement of the first transaction.

Specifically, the execution plan corresponding to the second-type statement may include the execution content and the storage node corresponding to the second-type statement. For example, taking the statement 3 shown in Table 1 as an example, the statement 3 is select s.name, s.gpa, t.name//from teacher_list as t//student_list as s//where//s.student_id='200401361211'//and// s.teacher_id=t.teacher_id. According to the statement 3 and the storage rule, the OLAP node may know that the data corresponding to the student number 200401361211 is stored in the storage node a and the data of the teacher corresponding to the student number 200401361211 is stored in the storage node b, and then the OLAP node may generate the execution plan corresponding to the statement 3, that is, the execution content included in the execution plan corresponding to the statement 3 is searching for the teacher number corresponding to the student number 200401361211 and then searching for the name of the teacher according to the obtained teacher number, and the storage nodes included in the execution plan corresponding to the statement 3 are the storage node a and storage node b.

In this way, after receiving this execution plan, the first node may process the first transaction by searching for the teacher number corresponding to the student number 200401361211 in the storage node a and searching for the name of the teacher according to the teacher number in the storage node b.

Step 408: the OLTP node sends the execution plan corresponding to the second-type statement of the first transaction to the first node.

Step 409: the first node receives the execution plan corresponding to the at least one statement of the first transaction sent by the OLTP node and the OLAP node, and processes the first transaction according to the execution plan corresponding to the at least one statement of the first transaction.

It should be noted that: (1) the above step number is only an exemplary representation of an execution process, and the present application does not specifically limit the sequence of all the steps, for example, in the above steps 401 and 402, the first node may also firstly send the second-type statement of the first transaction to the OLAP node and then send the first-type statement of the first transaction to the OLTP node; (2) in other possible embodiments, the number of second nodes may be greater than two, for example, the first node may receive the execution plans corresponding to the at least one statement of the first transaction sent by the second node A, the second node B and the second node C, and process the first transaction according to the execution plans corresponding to the at least one statement of the first transaction, where the specific processing procedure may refer to the content described above and will not be repeated here; (3) in other possible embodiments, in the above step 407, the OLAP node may also generate an initial execution plan corresponding to the second-type statement of the first transaction according to the second-type statement of the first transaction, and then the OLAP node sends the initial execution plan corresponding to the second-type statement of the first transaction to the OLTP node, and the OLTP node generates the execution plan corresponding to the second-type statement according to the initial execution plan corresponding to the second-type statement and sends the execution plan corresponding to the second-type statement to the first node. In this way, the OLAP node does not need to consider the storage rule of the distributed database (that is, not need to consider the storage node corresponding to each data list), and only needs to consider the internal logical relationship of each data list; while the OLTP node needs to integrate the storage rule of the distributed database with the internal logical relationship of each data list, thereby simplifying the structure of the OLAP node, reducing the complexity of the transaction processing system, and then reducing the implementation cost of the transaction processing system.

Figure 5:
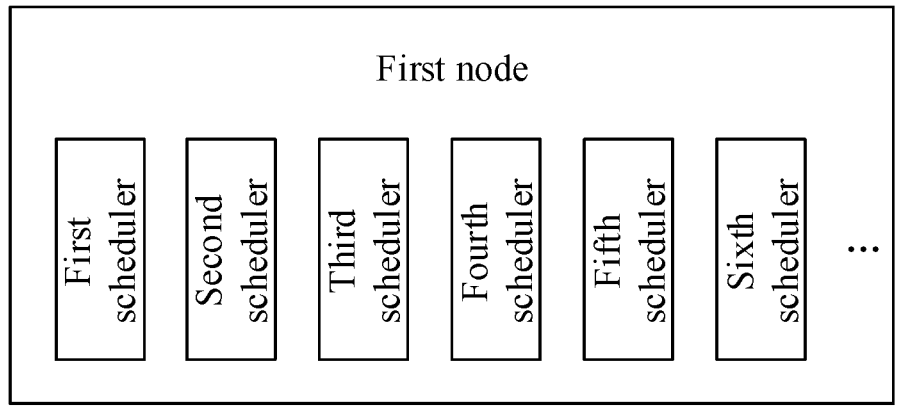
FIG. 5 is a structural schematic diagram of a first node in an embodiment of the invention.

Based on the content described above, embodiments of the invention further provide a method of processing a first transaction by a first node. As shown in FIG. 5, which is a structural schematic diagram of the first node, the first node may include multiple schedulers.

With this structure shown in FIG. 5, after receiving the execution plan(s) corresponding to the at least one statement of the first transaction, the first node may start the first transaction and allocate a corresponding scheduler to the first transaction, and then process the first transaction through the scheduler corresponding to the first transaction according to the execution plan(s) corresponding to the at least one statement of the first transaction.

For example, the first node receives the execution plan corresponding to at least one statement of the first transaction, the execution plan corresponding to at least one statement of the second transaction, and the execution plan corresponding to at least one statement of the third transaction, so the first node may start the first, second and third transactions respectively, and allocate the first scheduler to the first transaction, the second scheduler to the second transaction, and the third scheduler to the third transaction, so that multiple transactions can be processed concurrently, improving the processing efficiency of the transaction processing system and ensuring the transactionality.

Figure 6:
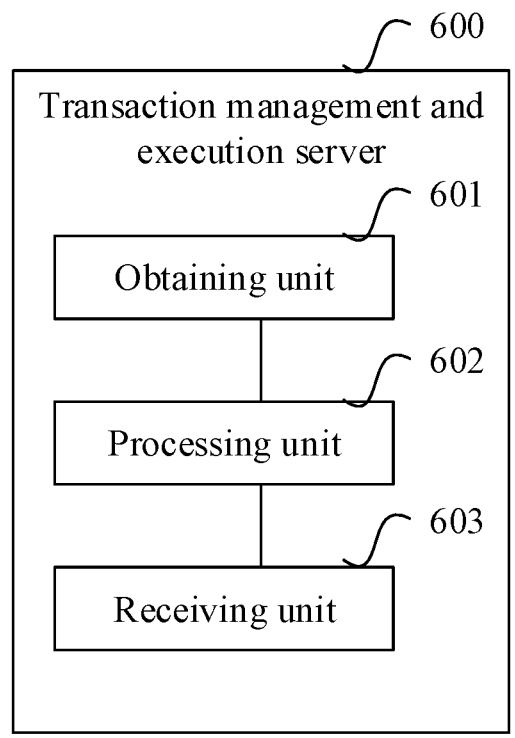
FIG. 6 is a structural schematic diagram of a transaction management and execution server provided by an embodiment of the invention.

Based on the same inventive concept, FIG. 6 exemplarily shows a structural schematic diagram of a transaction management and execution server provided by an embodiment of the invention. As shown in FIG. 6, the transaction management and execution server 600 includes an obtaining unit 601, a processing unit 602 and a receiving unit 603; wherein:

the obtaining unit 601 is configured to obtain at least one statement of a first transaction;

the processing unit 602 is configured, to determine a type of a first statement and send the first statement to a second node corresponding to the type of the first statement among at least one second node according to the type of the first statement, so that the second node corresponding to the type of the first statement generates an execution plan corresponding to the first statement according to the received first statement; wherein the first statement is any one of the at least one statement;

the receiving unit 603 is configured to receive an execution plan corresponding to the at least one statement of the first transaction sent by the at least one second node;

the processing unit 602 is further configured to process the first transaction according to the execution plan corresponding to the at least one statement of the first transaction.

Optionally, the processing unit 602 is specifically configured to:

start the first transaction and allocate a corresponding scheduler for the first transaction according to the execution plan corresponding to the at least one statement of the first transaction; and process the first transaction through the scheduler corresponding to the first transaction according to the execution plan corresponding to the at least one statement of the first transaction.

Optionally, the at least one second node includes an OLTP node and an OLAP node.

The processing unit 602 is specifically configured to:

if an execution plan corresponding to a first-type statement includes execution content corresponding to the first-type statement, then process the first transaction according to the execution content corresponding to the first-type statement; if the execution plan corresponding to the first-type statement includes the execution content and a storage node corresponding to the first-type statement, then access the storage node corresponding to the first-type statement according to the execution content corresponding to the first-type statement;

and access a storage node corresponding to a second-type statement according to execution content corresponding to the second-type statement; wherein an execution plan corresponding to the second-type statement includes the execution content and the storage node corresponding to the second-type statement.

Optionally, the at least one second node includes an OLTP node.

The receiving unit 603 is specifically configured to:

receive the execution plan corresponding to the at least one statement of the first transaction sent by the OLTP node, wherein the execution plan corresponding to the at least one statement of the first transaction includes an execution plan corresponding to a first-type statement of the first transaction and an execution plan corresponding to a second-type statement of the first transaction;

wherein the execution plan corresponding to the first-type statement is generated by the OLTP node according to the first-type statement; and the execution plan corresponding to the second-type statement is generated by the OLTP node according to a received initial execution plan of the second-type statement sent by the OLAP node;

the initial execution plan of the second-type statement includes execution content corresponding to the second-type statement, and the execution plan corresponding to the second-type statement includes the execution content and a storage node corresponding to the second-type statement.

Second Embodiment

Figure 7:
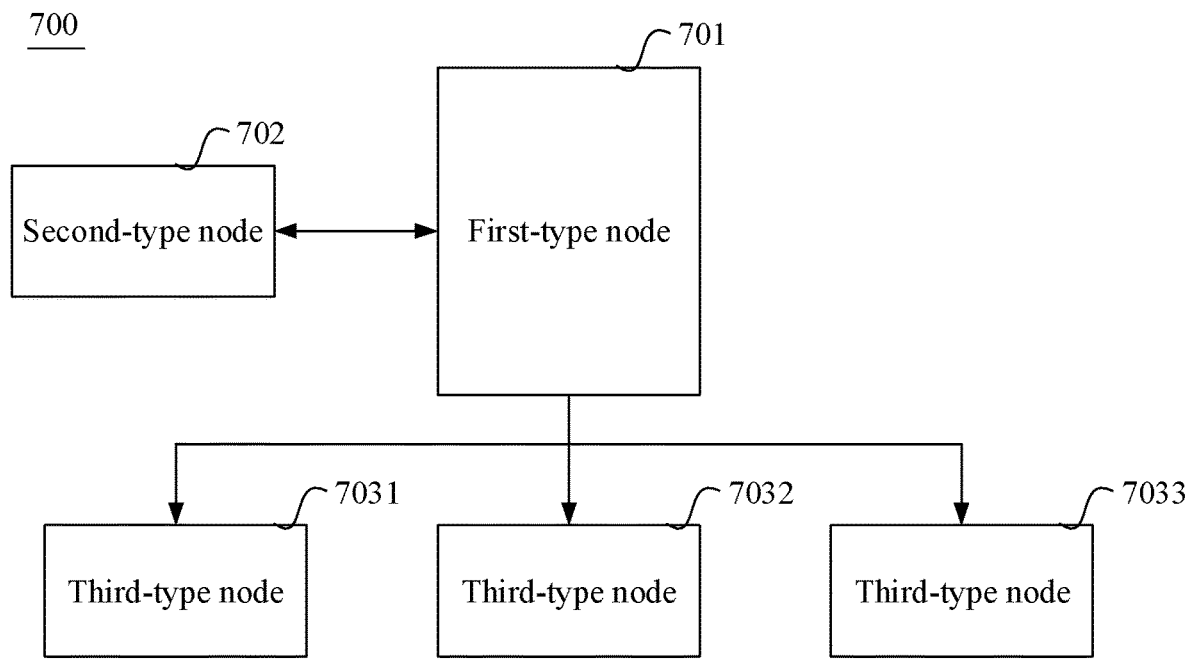
FIG. 7 is a schematic diagram of another system architecture applicable to an embodiment of the invention.

FIG. 7 exemplarily shows a schematic diagram of another system architecture applicable to an embodiment of the invention. As shown in FIG. 7, the system architecture 700 applicable to the embodiment of the invention includes a first-type node 701, a second-type node 702 and third-type nodes, such as a third-type node 7031, a third-type node 7032 and a third-type node 7033 as shown in FIG. 7, wherein the third-type node may be a database for storing data.

In a specific implementation process, the first-type node 701 may obtain at least one statement of a certain transaction and classify each statement of the transaction, and then send at least one statement to itself (i.e., the first-type node 701) and the second-type node 702 respectively according to the type of each statement; further, after receiving the statement, the second-type node 702 may generate an initial execution plan corresponding to the statement according to the received statement and send the initial execution plan corresponding to the statement to the first-type node 701; and further, the first-type node 701 may generate the execution plan corresponding to the statement according to the received initial execution plan corresponding to the statement sent by the second-type node 702, and process the transaction according to the execution plan corresponding to the statement.

It should be noted that: (1) the number of second-type nodes is not specifically limited in the embodiments of the invention, the second-type node 702 shown in FIG. 7 is just an example, and those skilled in the art can increase/decrease the number of second-type nodes according to the experience and actual condition; and (2) the number of third-type nodes is not specifically limited in the embodiments of the invention, the third-type node 7031, the third-type node 7032 and the third-type node 7033 shown in FIG. 7 are just an example, and those skilled in the art can increase/decrease the number of third-type nodes according to the experience and actual condition.

Figure 8:
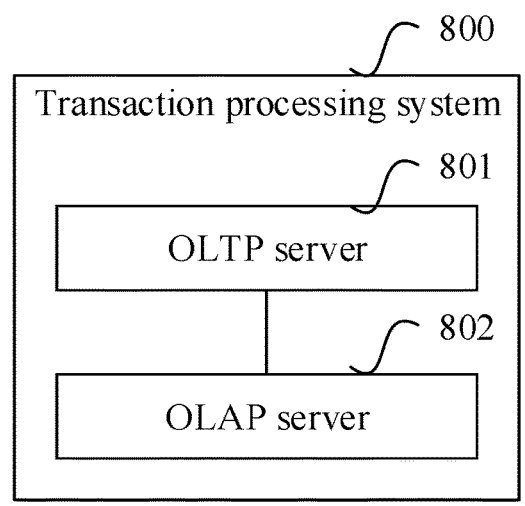
FIG. 8 is a structural schematic diagram of another transaction processing system provided by an embodiment of the invention.

In order to describe the system architecture shown in FIG. 7 more clearly, the system architecture described in FIG. 7 will be exemplified below in combination with FIG. 8. As shown in FIG. 8, it is a structural schematic diagram of another transaction processing system provided by an embodiment of the invention. The transaction processing system 800 includes an OLTP server 801 and an OLAP server 802.

The OLTP server 801 is configured to: obtain at least one statement of a first transaction, determine a type of a first statement, generate an execution plan corresponding to a first-type statement if the first statement is determined as the first-type statement, and send a second-type statement to the OLAP server 802 if the first statement is determined as the second-type statement. The first statement is any one of the at least one statement.

The OLAP server 802 is configured to: receive the second-type statement sent by the OLTP server, generate an initial execution plan corresponding to the second-type statement, and send the initial execution plan corresponding to the second-type statement to the OLTP server 801.

The OLTP server 801 is further configured to: receive the initial execution plan corresponding to the second-type statement sent by the OLAP server 802, generate an execution plan corresponding to the second-type statement according to the initial execution plan corresponding to the second-type statement, and process the first transaction according to the execution plan corresponding to the first-type statement and the execution plan corresponding to the second-type statement.

It should be noted that, in the transaction processing system shown in FIG. 8, the OLTP server 801 may be the first-type node 701 shown in FIG. 7, and the OLAP server 802 may be the second-type node 702 shown in FIG. 7.

Figure 9:
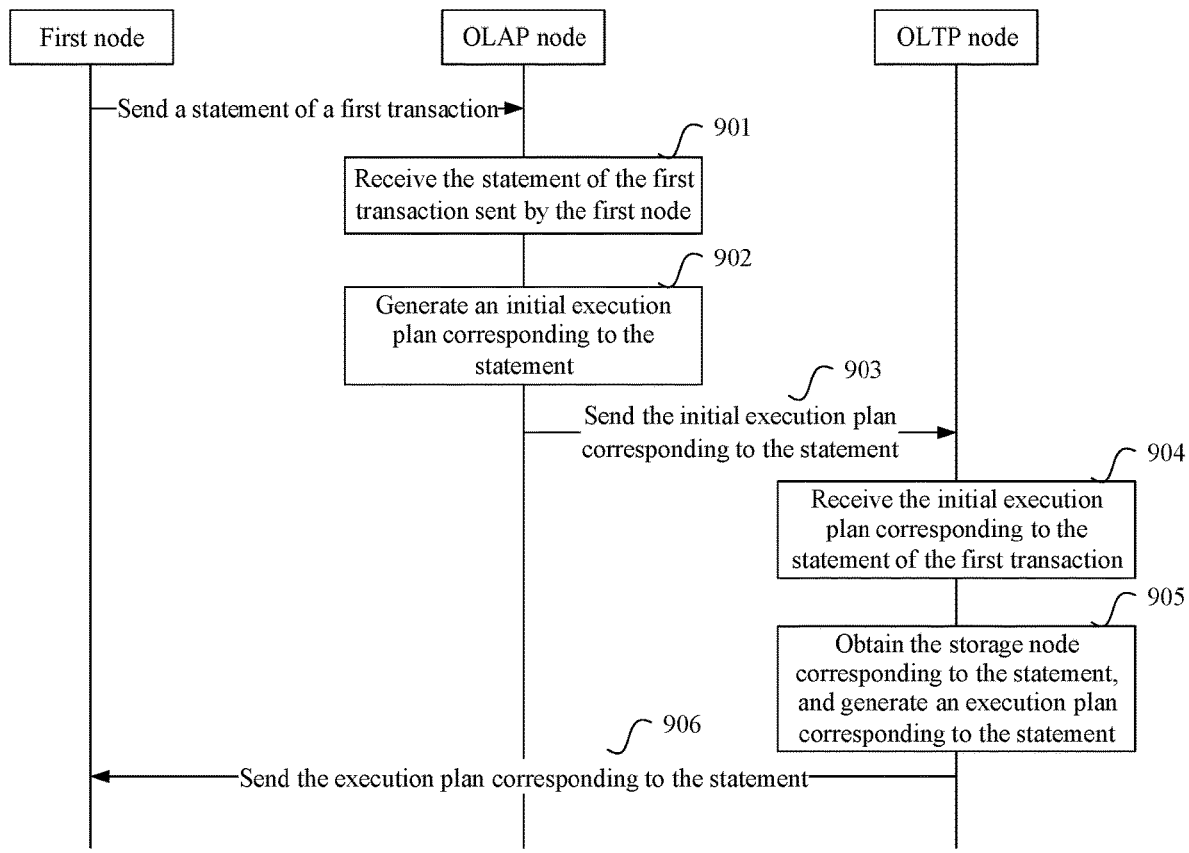
FIG. 9 is a flow schematic diagram of another transaction processing method provided by an embodiment of the invention.

Based on the system architecture shown in FIG. 7, FIG. 9 exemplarily shows a flow schematic diagram corresponding to another transaction processing method provided by an embodiment of the invention, wherein the OLTP node may be the OLTP server 801 shown in FIG. 8, and the OLAP node may be the OLAP server 802 shown in FIG. 8. The method specifically includes the following steps.

Step 901: the OLAP node receives a statement of a first transaction sent by a first node.

Step 902: the OLAP node generates an initial execution plan corresponding to the statement.

Step 903: the OLAP node sends the initial execution plan corresponding to the statement to the OLTP node.

Step 904: the OLTP node receives the initial execution plan corresponding to the statement of the first transaction sent by the OLAP node.

Step 905: the OLTP node obtains the storage node corresponding to the statement according to the initial execution plan corresponding to the statement, and then generates an execution plan corresponding to the statement.

Step 906: the OLTP node sends the execution plan corresponding to the statement to the first node, so that the first node processes the first transaction according to the execution plan corresponding to the statement.

It should be noted that, in the content described in the steps 901 to 906, the first node may be directly deployed in the OLTP server. In this way, the complexity of the transaction processing system can be reduced.

Specifically, in the steps 902 and 903, the initial execution plan corresponding to the statement includes the execution content corresponding to the statement. For example, taking the statement 3 shown in Table 1 as an example, the statement 3 is select s.name, s.gpa, t.name//from teacher_list as t//student_list as s//where// s.student_id='200401361211'//and// s.teacher_id=t.teacher_id. According to the statement 3, the OLAP node may know that there is a need to search for the data corresponding to the student number 200401361211 and then search for the name of the teacher according to the teacher number in the data corresponding to the student number 200401361211, that is, the execution content included in the initial execution plan corresponding to the statement 3 is searching for the teacher number corresponding to the student number 200401361211 and then searching for the name of the teacher according to the obtained teacher number.

Further, in the step 905, the execution plan corresponding to the statement includes the execution content and storage node corresponding to the statement. Still taking the content described above as an example, according to the initial execution plan corresponding to the statement 3 and the storage rule, the OLTP node may know that the data corresponding to the student number 200401361211 is stored in the storage node a and the data of the teacher corresponding to the student number 200401361211 is stored in the storage node b, and then the OLTP node may generate the execution plan corresponding to the statement 3, that is, the execution content included in the execution plan corresponding to the statement 3 is searching for the teacher number corresponding to the student number 200401361211 and then searching for the name of the teacher according to the obtained teacher number, and the storage nodes included in the execution plan corresponding to the statement 3 are the storage node a and storage node b.

Thus, in the content described in the above steps 901 to 906, the OLAP node does not need to consider the storage rule of the distributed database (that is, not need to consider the storage node corresponding to each data list), and only needs to consider the internal logical relationship of each data list; while the OLTP node needs to integrate the storage rule of the distributed database with the internal logical relationship of each data list. Such method can simplify the structure of the OLAP node, reduce the complexity of the transaction processing system, and then reduce the implementation cost of the transaction processing system.

It should be noted that, in other possible embodiments, if the system structure shown in FIG. 7 has multiple second-type nodes, such as a second-type node A and a second-type node B, in an example, the second-type node A and the second-type node B can respectively generate initial execution plans corresponding to statements according to the respectively received statements, and then the second-type node A and the second-type node B can respectively send the initial execution plans corresponding to the statements to the first-type node; in another example, the second-type node A can generate an initial execution plan A corresponding to the statement according to the received statement, and then the second-type node A sends the initial execution plan A corresponding to the statement to the second-type node B, and the second-type node B generates an initial execution plan B corresponding to the statement according to the initial execution plan A corresponding to the statement and sends the initial execution plan B corresponding to the statement to the first-type node. By analogy, if there are more second-type nodes (that is, the number of second-type nodes is greater than two) in the system structure shown in FIG. 7, the method described above can also be used, which is not repeated here.

In the step 906, also shown in FIG. 5 which is a structural schematic diagram of the first node, the first node may still include multiple schedulers. After receiving the execution plan corresponding to at least one statement of the first transaction, the first node may start the first transaction and allocate a corresponding scheduler to the first transaction, and then process the first transaction through the scheduler corresponding to the first transaction according to the execution plan corresponding to at least one statement of the first transaction.

Figure 10:
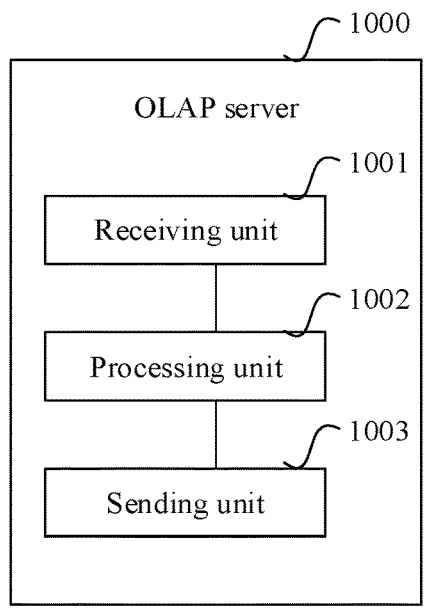
FIG. 10 is a structural schematic diagram of an OLAP server provided by an embodiment of the invention.

Based on the same inventive concept, FIG. 10 exemplarily shows a structural schematic diagram of an OLAP server provided by an embodiment of the invention. As shown in FIG. 10, the OLAP server 1000 includes a receiving unit 1001, a processing unit 1002 and a sending unit 1003; wherein:

the receiving unit 1001 is configured to receive a statement of a first transaction sent by a first node;

the processing unit 1002 is configured to generate an initial execution plan corresponding to the statement that includes execution content corresponding to the statement;

the sending unit 1003 is configured to send the initial execution plan corresponding to the statement to an OLTP node, so that the OLTP node generates an execution plan corresponding to the statement according to the initial execution plan of the statement.

Figure 11:
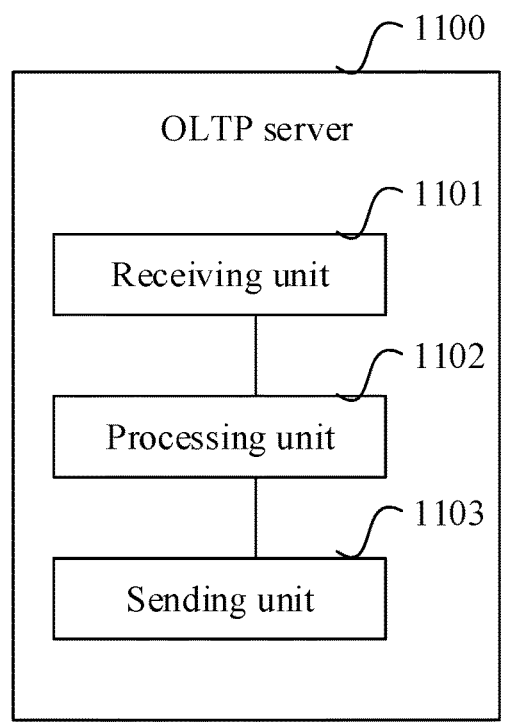
FIG. 11 is a structural schematic diagram of an OLTP server provided by an embodiment of the invention.

Based on the same inventive concept, FIG. 11 exemplarily shows a structural schematic diagram of an OLTP server provided by an embodiment of the invention. As shown in FIG. 11, the OLTP server 1100 includes a receiving unit 1101, a processing unit 1102 and a sending unit 1103; wherein:

the receiving unit 1101 is configured to receive an initial execution plan corresponding to a statement of a first transaction sent by an OLAP node, wherein the initial execution plan corresponding to the statement includes execution content corresponding to the statement;

the processing unit 1102 is configured to obtain a storage node corresponding to the statement according to the initial execution plan corresponding to the statement, and then generate an execution plan corresponding to the statement; wherein the execution plan corresponding to the statement includes the execution content and storage node corresponding to the statement;

the sending unit 1103 is configured to send the execution plan corresponding to the statement to a first node, so that the first node processes the first transaction according to the execution plan corresponding to the statement.

An embodiment of the invention provides a server, which includes:

a memory configured to store a software program;

a processor configured to read the software program in the memory and perform the transaction processing method described above.

An embodiment of the invention provides a computer storage medium storing a software program that implements the transaction processing method described above when being read and executed by one or more processors.

In the embodiments of the invention, after obtaining at least one statement of the first transaction, the first node may classify each statement and send the at least one statement to at least one second node respectively according to the type of each statement, so that the at least one second node generates the execution plan corresponding to the statement according to the received statement; and then the first node may process the first transaction according to the received execution plan corresponding to at least one statement of the first transaction sent by the at least one second node. In this way, since there is at least one second node in the transaction processing system, after obtaining at least one statement of the first transaction, the first node may classify and then send at least one statement to at least one second node. This method of classifying and processing statements can reduce the design complexity of the statement system; further, compared with the mode in which only one server is used for transaction processing in the prior art, the embodiments of the invention can process multiple types of statements at the same time, effectively improving the processing performance of the system, reducing the operating burden of the system, and then increasing the overall parallelism of the system; and furthermore, at least one second node only needs to send the execution plan corresponding to the statement to the first node, and the first node performs unified processing on at least one statement included in the first transaction, thereby ensuring the transactionality.

Figure 12:
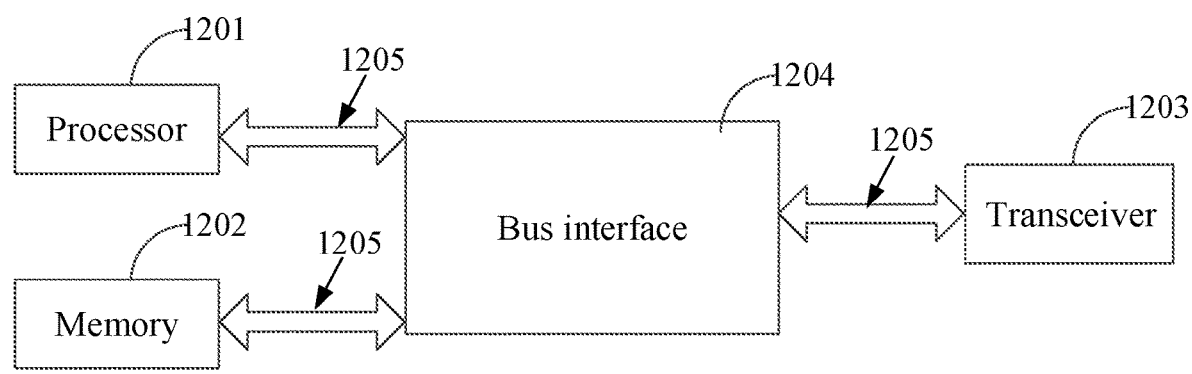
FIG. 12 is a structural schematic diagram of an electronic device provided by an embodiment of the invention.

Based on the same concept, the present application provides an electronic device that may be used to perform the above method flow on the transaction management and execution server side. FIG. 12 is a structural schematic diagram of an electronic device provided by the present application. The electronic device includes a processor 1201, a memory 1202, a transceiver 1203 and a bus interface 1204; wherein the processor 1201, the memory 1202, the transceiver 1203 and the bus interface 1204 are connected to each other through buses 1205.

The memory 1202 is used to store a program; and specifically, the program may include program codes including the computer operation instructions. The memory 1202 may include a volatile memory, e.g., Random-Access Memory (RAM); the memory may also include a non-volatile memory, e.g., flash memory, Hard Disk Drive (HDD) or Solid-State Drive (SSD); and the memory 1202 may also include a combination of the above types of memories.

The memory 1202 stores the elements of: executable modules or data structures, or their subsets, or their extension sets.

Operation instructions includes various operation instructions for implementing various operations.

Operation systems includes various system programs for implementing various basic services and processing hardware-based tasks.

The bus 1205 may be the Peripheral Component Interconnect (PCI) bus or Extended Industry Standard Architecture (EISA) bus or the like. The buses may be divided into the address bus, data bus, control bus and so on. For ease of representation, the buses are represented by only one thick line in FIG. 12, but it does not represent only one bus or only one type of bus.

The bus interface 1204 may be a wired communication interface, a wireless bus interface or the combination thereof, wherein the wired bus interface may be an Ethernet interface for example. The Ethernet interface may be an optical interface, an electrical interface or the combination thereof. The wireless bus interface may be a WLAN interface.

The processor 1201 may be a Central Processing Unit (CPU), a Network Processor (NP) or the combination of the CPU and NP. It may also be a hardware chip. The above-mentioned hardware chip may be an Application-Specific Integrated Circuit (ASIC), a Programmable Logic Device (PLD) or the combination thereof. The above-mentioned PLD may be a Complex Programmable Logic Device (CPLD), a Field-Programmable Gate Array (FPGA), a Generic Array Logic (GAL) or any combination thereof.

The processor 1201 is configured to read the program in the memory 1202 to perform the following method: obtaining at least one statement of a first transaction; determining a type of a first statement, and sending the first statement to a second node corresponding to the type of the first statement among at least one second node according to the type of the first statement, so that the second node corresponding to the type of the first statement generates an execution plan corresponding to the statement according to the received statement; wherein the first statement is any one of the at least one statement.

The memory 1202 is configured to store one or more executable programs and may store the data used by the processor 1201 when performing the operations.

The transceiver 1203 is configured, under the control of the processor 1201, to receive the execution plan corresponding to the at least one statement of the first transaction sent by the at least one second node; and the processing unit is further configured to process the first transaction according to the execution plan corresponding to the at least one statement of the first transaction.

Optionally, the processor 1201 is configured to: start the first transaction and allocate a corresponding scheduler for the first transaction according to the execution plan corresponding to the at least one statement of the first transaction; and process the first transaction through the scheduler corresponding to the first transaction according to the execution plan corresponding to the at least one statement of the first transaction.

Optionally, the at least one second node includes an OLTP node and an OLAP node; and the processor 1201 is configured to: if an execution plan corresponding to a first-type statement includes execution content corresponding to the first-type statement, then process the first transaction according to the execution content corresponding to the first-type statement; if the execution plan corresponding to the first-type statement includes the execution content and a storage node corresponding to the first-type statement, then access the storage node corresponding to the first-type statement according to the execution content corresponding to the first-type statement; and access a storage node corresponding to a second-type statement according to execution content corresponding to the second-type statement; wherein an execution plan corresponding to the second-type statement includes the execution content and storage node corresponding to the second-type statement.

Optionally, the at least one second node includes an OLTP node; and the transceiver 1203 is configured to: receive the execution plan corresponding to the at least one statement of the first transaction sent by the OLTP node, wherein the execution plan corresponding to the at least one statement of the first transaction includes an execution plan corresponding to a first-type statement of the first transaction and an execution plan corresponding to a second-type statement of the first transaction; wherein the execution plan corresponding to the first-type statement is generated by the OLTP node according to the first-type statement; and the execution plan corresponding to the second-type statement is generated by the OLTP node according to a received initial execution plan of the second-type statement sent by the OLAP node; the initial execution plan of the second-type statement includes execution content corresponding to the second-type statement, and the execution plan corresponding to the second-type statement includes the execution content and a storage node corresponding to the second-type statement.

It should be understood that the division of the above units is only the division of the logical functions, and these units may be fully or partially integrated into a physical entity or may be separated physically in the actual implementations. In the embodiment of the present application, the receiving unit 603 may be implemented by the transceiver 1203, and the obtaining unit 601 and the processing unit 602 may be implemented by the processor 1201. As shown in FIG. 12, the electronic device 1200 may include a processor 1201, a transceiver 1203 and a memory 1202, wherein the memory 1202 may be configured to store the programs/codes pre-installed when the electronic device 1200 leaves the factory, and may also store the codes used to be executed by the processor 1201, etc.

As can be seen from the above, in the embodiments of the invention, since there is at least one second node in the transaction processing system, after obtaining at least one statement of the first transaction, the first node may classify and send at least one statement to the corresponding second node. Compared with the mode in which only one server is used for transaction processing in the prior art, the embodiments of the invention can process multiple types of statements at the same time, effectively improving the processing efficiency of the system and reducing the operating burden of the system; further, at least one second node only needs to send the execution plan corresponding to the statement to the first node, and the first node performs unified processing on at least one statement included in the first transaction, thereby ensuring the transactionality.

Figure 13:
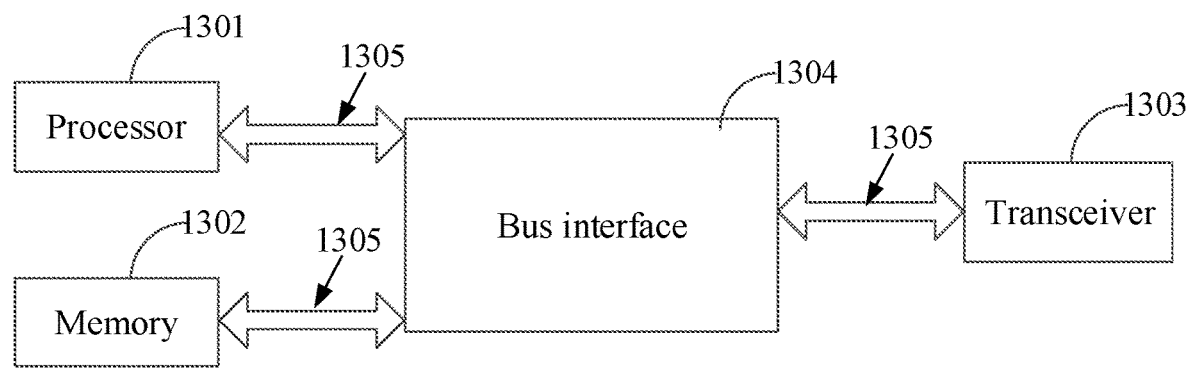
FIG. 13 is a structural schematic diagram of an electronic device provided by an embodiment of the invention.

Based on the same concept, the present application provides an electronic device that can be used to perform the above method flow on the OLAP server side. FIG. 13 is a structural schematic diagram of an electronic device provided by the present application. The electronic device includes a processor 1301, a memory 1302, a transceiver 1303 and a bus interface 1304; wherein the processor 1301, the memory 1302, the transceiver 1303 and the bus interface 1304 are connected to each other through buses 1305.

The memory 1302 is used to store a program; and specifically, the program may include program codes including the computer operation instructions. The memory 1302 may include a volatile memory, e.g., Random-Access Memory (RAM); the memory may also include a non-volatile memory, e.g., flash memory, Hard Disk Drive (HDD) or Solid-State Drive (SSD); and the memory 1302 may also include a combination of the above types of memories.

The memory 1302 stores the elements of: executable modules or data structures, or their subsets, or their extension sets.

Operation instructions includes various operation instructions for implementing various operations.

Operation systems includes various system programs for implementing various basic services and processing hardware-based tasks.

The bus 1305 may be the Peripheral Component Interconnect (PCI) bus or Extended Industry Standard Architecture (EISA) bus or the like. The buses may be divided into the address bus, data bus, control bus and so on. For ease of representation, the buses are represented by only one thick line in FIG. 13, but it does not represent only one bus or only one type of bus.

The bus interface 1304 may be a wired communication interface, a wireless bus interface or the combination thereof, wherein the wired bus interface may be an Ethernet interface for example. The Ethernet interface may be an optical interface, an electrical interface or the combination thereof. The wireless bus interface may be a WLAN interface.

The processor 1301 may be a Central Processing Unit (CPU), a Network Processor (NP) or the combination of the CPU and NP. It may also be a hardware chip. The above-mentioned hardware chip may be an Application-Specific Integrated Circuit (ASIC), a Programmable Logic Device (PLD) or the combination thereof. The above-mentioned PLD may be a Complex Programmable Logic Device (CPLD), a Field-Programmable Gate Array (FPGA), a Generic Array Logic (GAL) or any combination thereof.

The processor 1301 is configured to read the program in the memory 1302 to the following method: generating an initial execution plan corresponding to the statement that includes the execution content corresponding to the statement.

The transceiver 1303 is configured to receive a statement of a first transaction sent by a first node; and send an initial execution plan corresponding to the statement to an OLTP node, so that the OLTP node generates an execution plan corresponding to the statement according to the initial execution plan corresponding to the statement.

It should be understood that the division of the above units is only the division of the logical functions, and these units may be fully or partially integrated into a physical entity or may be separated physically in the actual implementations. In the embodiment of the present application, the receiving unit 1001 and the sending unit 1003 may be implemented by the transceiver 1303, and the processing unit 1002 may be implemented by the processor 1301. As shown in FIG. 13, the electronic device 1300 may include a processor 1301, a transceiver 1303 and a memory 1302, wherein the memory 1302 may be configured to store the programs/codes pre-installed when the electronic device 1300 leaves the factory, and may also store the codes used to be executed by the processor 1301, etc.

Figure 14:
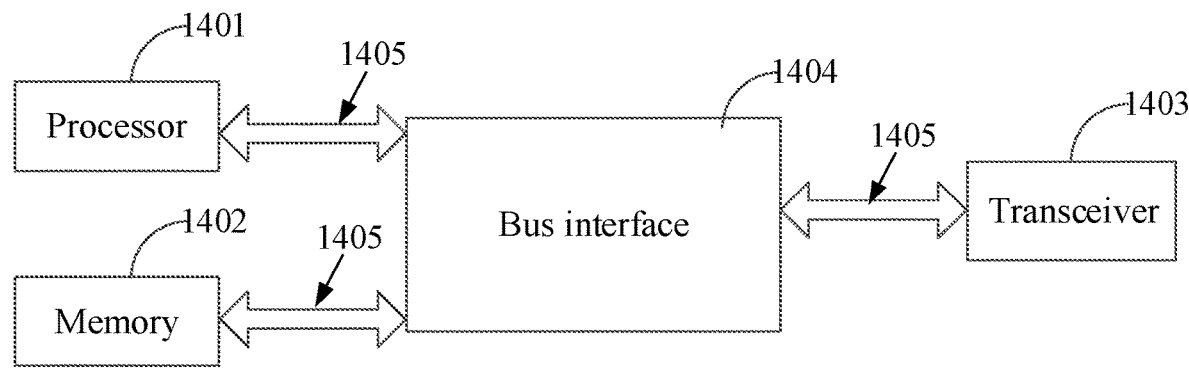
FIG. 14 is a structural schematic diagram of an electronic device provided by an embodiment of the invention.

Based on the same concept, the present application provides an electronic device that can be used to perform the above method flow on the OLTP server side. FIG. 14 is a structural schematic diagram of an electronic device provided by the present application. The electronic device includes a processor 1401, a memory 1402, a transceiver 1403 and a bus interface 1404; wherein the processor 1401, the memory 1402, the transceiver 1403 and the bus interface 1404 are connected to each other through buses 1405.

The memory 1402 is used to store a program; and specifically, the program may include program codes including the computer operation instructions. The memory 1402 may include a volatile memory, e.g., Random-Access Memory (RAM); the memory may also include a non-volatile memory, e.g., flash memory, Hard Disk Drive (HDD) or Solid-State Drive (SSD); and the memory 1402 may also include a combination of the above types of memories.

The memory 1402 stores the elements of: executable modules or data structures, or their subsets, or their extension sets.

Operation instructions includes various operation instructions for implementing various operations.

Operation systems includes various system programs for implementing various basic services and processing hardware-based tasks.

The bus 1405 may be the Peripheral Component Interconnect (PCI) bus or Extended Industry Standard Architecture (EISA) bus or the like. The buses may be divided into the address bus, data bus, control bus and so on. For ease of representation, the buses are represented by only one thick line in FIG. 14, but it does not represent only one bus or only one type of bus.

The bus interface 1404 may be a wired communication interface, a wireless bus interface or the combination thereof, wherein the wired bus interface may be an Ethernet interface for example. The Ethernet interface may be an optical interface, an electrical interface or the combination thereof. The wireless bus interface may be a WLAN interface.

The processor 1401 may be a Central Processing Unit (CPU), a Network Processor (NP) or the combination of the CPU and NP. It may also be a hardware chip. The above-mentioned hardware chip may be an Application-Specific Integrated Circuit (ASIC), a Programmable Logic Device (PLD) or the combination thereof. The above-mentioned PLD may be a Complex Programmable Logic Device (CPLD), a Field-Programmable Gate Array (FPGA), a Generic Array Logic (GAL) or any combination thereof.

The processor 1401 is configured to read the program in the memory 1402 and perform the following method: obtaining a storage node corresponding to the statement according to the initial execution plan corresponding to the statement, and then generating the execution plan corresponding to the statement; wherein the execution plan corresponding to the statement includes the execution content and storage node corresponding to the statement.

The transceiver 1403 is configured to receive an initial execution plan of a statement of a first transaction sent by an OLAP node, wherein the initial execution plan corresponding to the statement includes the execution content corresponding to the statement; and send an execution plan corresponding to the statement to a first node, so that the first node processes the first transaction according to the execution plan corresponding to the statement.

It should be understood that the division of the above units is only the division of the logical functions, and these units may be fully or partially integrated into a physical entity or may be separated physically in the actual implementations. In the embodiment of the present application, the receiving unit 1101 and the sending unit 1103 may be implemented by the transceiver 1403, and the processing unit 1102 may be implemented by the processor 1401. As shown in FIG. 14, the electronic device 1400 may include a processor 1401, a transceiver 1403 and a memory 1402, wherein the memory 1402 may be configured to store the programs/codes pre-installed when the electronic device 1400 leaves the factory, and may also store the codes used to be executed by the processor 1401, etc.

It should be understood by those skilled in the art that the embodiments of the invention may be provided as methods, systems or computer program products. Thus the embodiments of the invention can take the form of hardware embodiments alone, software embodiments alone, or embodiments combining the software and hardware aspects. Also the embodiments of the invention can take the form of computer program products implemented on one or more computer usable storage mediums (including but not limited to magnetic disk memories, CD-ROMs, optical memories and the like) containing computer usable program codes therein.

The embodiments of the invention are described by reference to the flow charts and/or the block diagrams of the methods, the devices (systems) and the computer program products according to the embodiments of the invention. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Evidently those skilled in the art can make various modifications and variations to the embodiments of the invention without departing from the spirit and scope of the present application. Thus the present application is also intended to encompass these modifications and variations therein as long as these modifications and variations to the embodiments of the invention come into the scope of the claims of the present application and their equivalents.

What is claimed is:

1. A transaction processing method performed using a transaction management and execution server, an online Transaction Processing (OLTP) server, and an Online Analytical Processing (OLAP) server, the method comprising:
    obtaining, by the transaction management and execution server, at least one statement of a first transaction;
    determining, by the transaction management and execution server, a type of a first statement, wherein the first statement is any one of the at least one statement;
    sending, by the transaction management and execution server, the first statement to a receiving node, so that the receiving node generates an execution plan corresponding to the first statement according to the first statement, wherein the receiving node is selected according to the type of the first statement as at least one of the OLTP server or the OLAP server, wherein, in a first case where the first statement is of a first type, the receiving node is selected as the OLTP server and, in a second case where the first statement is of a second type, the receiving node is selected as the OLAP server;
    receiving, by the transaction management and execution server, an execution plan corresponding to the at least one statement of the first transaction sent by the receiving node; and
    processing, by the transaction management and execution server, the first transaction according to the execution plan corresponding to the at least one statement of the first transaction;

wherein:
the receiving node includes the OLTP server and the OLAP server;
said receiving, by the transaction management and execution server, the execution plan corresponding to the at least one statement of the first transaction sent by the receiving node, and said processing, by the transaction management and execution server, the first transaction according to the execution plan corresponding to the at least one statement of the first transaction, comprises:
receiving, by the transaction management and execution server, an execution plan corresponding to a first-type statement of the first transaction sent by the OLTP server, such that:
when the execution plan corresponding to the first-type statement comprises execution content corresponding to the first-type statement, processing, by the transaction management and execution server, the first transaction according to the execution content corresponding to the first-type statement; and
when the execution plan corresponding to the first-type statement comprises the execution content and a storage node corresponding to the first-type statement, accessing, by the transaction management and execution server, the storage node corresponding to the first-type statement according to the execution content corresponding to the first-type statement;
receiving, by the transaction management and execution server, an execution plan corresponding to a second-type statement of the first transaction sent by the OLAP server, wherein the execution plan corresponding to the second-type statement comprises execution content and a storage node corresponding to the second-type statement; and accessing, by the transaction management and execution server, the storage node corresponding to the second-type statement according to the execution content corresponding to the second-type statement.

2. The method according to claim 1, wherein said processing, by the transaction management and execution server, the first transaction according to the execution plan corresponding to the at least one statement of the first transaction, comprises:
starting, by the transaction management and execution server, the first transaction and allocating a scheduler corresponding to the first transaction according to the execution plan corresponding to the at least one statement of the first transaction; and
processing, by the transaction management and execution server, the first transaction through the scheduler corresponding to the first transaction according to the execution plan corresponding to the at least one statement of the first transaction.

3. A server, comprising:
a memory configured to store a software program;
a processor configured to read the software program in the memory and perform the transaction processing method of claim 1.

4. An electronic device, comprising a processor, a memory, a transceiver and a bus interface, wherein the processor, the memory, and the transceiver, and the bus interface are connected through buses;
the processor is configured to read a program in the memory to perform the transaction processing method of claim 1.

5. A non-transitory computer readable storage medium, storing computer instructions which cause a computer to perform the transaction processing method of claim 1.

6. A computer program product, comprising a computer program stored on a non-transitory computer readable storage medium, wherein the computer program comprises program instructions which, when executed by a computer, cause the computer to perform the transaction processing method of claim 1.

7. A transaction processing method performed using a transaction management and execution server, an online Transaction Processing (OLTP) server, and an Online Analytical Processing (OLAP) server, the method comprising:
obtaining, by the transaction management and execution server, at least one statement of a first transaction;
determining, by the transaction management and execution server, a type of a first statement, wherein the first statement is any one of the at least one statement;
sending, by the transaction management and execution server, the first statement to a receiving node, so that the receiving node generates an execution plan corresponding to the first statement according to the first statement, wherein the receiving node is selected according to the type of the first statement as at least one of the OLTP server or the OLAP server, wherein, in a first case where the first statement is of a first type, the receiving node is selected as the OLTP server and, in a second case where the first statement is of a second type, the receiving node is selected as the OLAP server;
receiving, by the transaction management and execution server, an execution plan corresponding to the at least one statement of the first transaction sent by the receiving node; and
processing, by the transaction management and execution server, the first transaction according to the execution plan corresponding to the at least one statement of the first transaction;
wherein the receiving node includes OLTP server; and
said receiving, by the transaction management and execution server, the execution plan corresponding to the at least one statement of the first transaction sent by the receiving node, comprises:
receiving, by the transaction management and execution server, the execution plan corresponding to the at least one statement of the first transaction sent by the OLTP server, wherein the execution plan corresponding to the at least one statement of the first transaction comprises an execution plan corresponding to a first-type statement of the first transaction and an execution plan corresponding to a second-type statement of the first transaction;
wherein the execution plan corresponding to the first-type statement is generated by the OLTP server according to the first-type statement; and the execution plan corresponding to the second-type statement is generated by the OLTP server according to a received initial execution plan corresponding to the second-type statement sent by an OLAP server;
the initial execution plan corresponding to the second-type statement comprises execution content corresponding to the second-type statement, and the execution plan corresponding to the second-type statement comprises the execution content and a storage node corresponding to the second-type statement.

8. The method according to claim 7, wherein said processing, by the transaction management and execution server, the first transaction according to the execution plan corresponding to the at least one statement of the first transaction, comprises:
- starting, by the transaction management and execution server, the first transaction and allocating a scheduler corresponding to the first transaction according to the execution plan corresponding to the at least one statement of the first transaction; and
- processing, by the transaction management and execution server, the first transaction through the scheduler corresponding to the first transaction according to the execution plan corresponding to the at least one statement of the first transaction.

9. A server, comprising:
a memory configured to store a software program;
a processor configured to read the software program in the memory and perform the transaction processing method of claim 7.

10. An electronic device, comprising a processor, a memory, a transceiver and a bus interface, wherein the processor, the memory, and the transceiver, and the bus interface are connected through buses;
the processor is configured to read a program in the memory to perform the transaction processing method of claim 7.

11. A non-transitory computer readable storage medium, storing computer instructions which cause a computer to perform the transaction processing method of claim 7.

12. A computer program product, comprising a computer program stored on a non-transitory computer readable storage medium, wherein the computer program comprises program instructions which, when executed by a computer, cause the computer to perform the transaction processing method of claim 7.

* * * * *